UNITED STATES PATENT OFFICE.

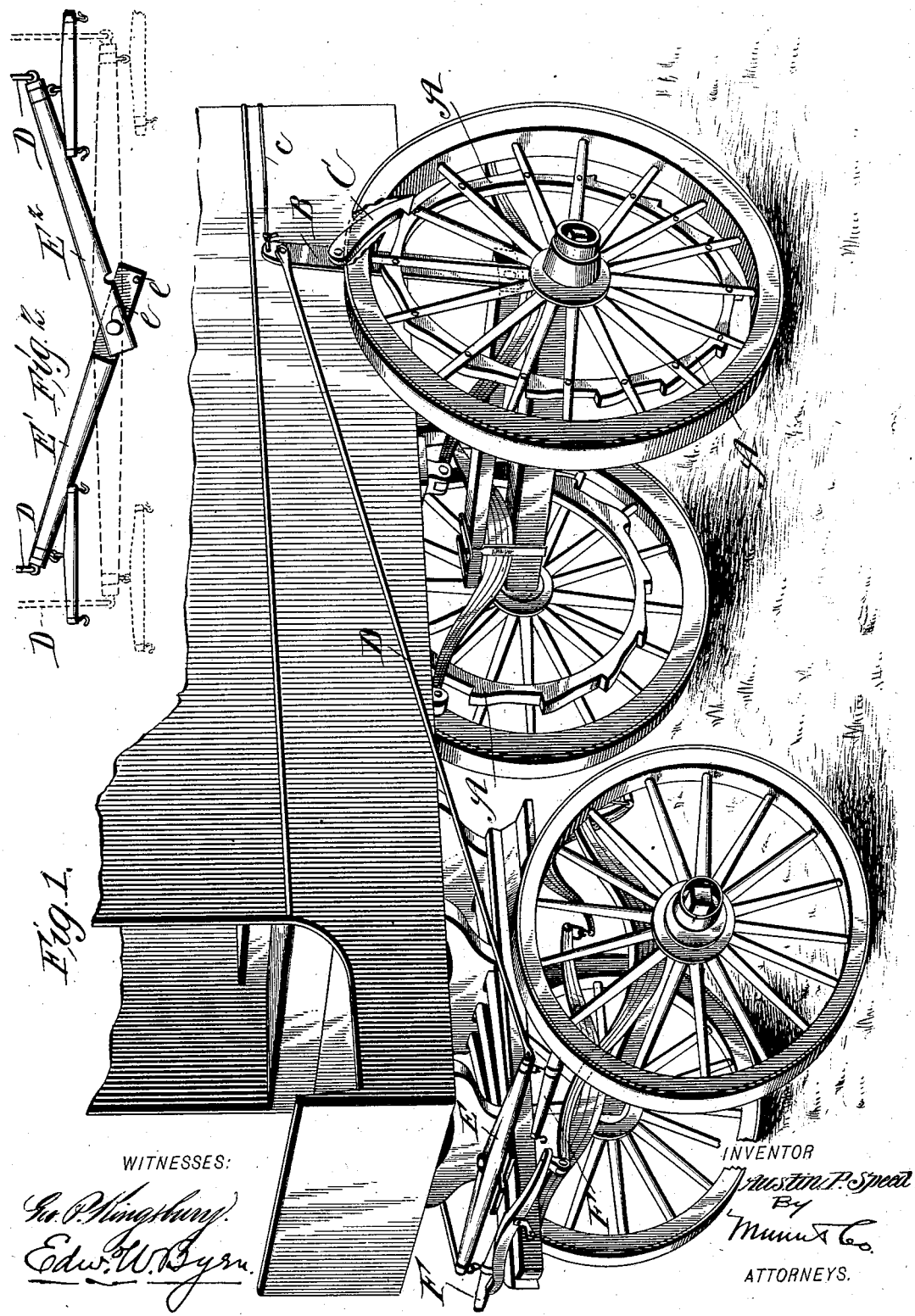

AUSTIN P. SPEED, OF LOUISVILLE, KENTUCKY.

VEHICLE DRAFT ATTACHMENT.

SPECIFICATION forming part of Letters Patent No. 722,639, dated March 10, 1903.

Application filed December 13, 1902. Serial No. 135,089. (No model.)

*To all whom it may concern:*

Be it known that I, AUSTIN P. SPEED, of Louisville, in the county of Jefferson and State of Kentucky, have invented a new and useful Improvement in Vehicle Draft Attachments, of which the following is a specification.

The object of my invention is to provide a draft attachment for team-drawn vehicles which shall enable the team to exert a greater leverage for draft, both for starting the load and also in the normal travel of the vehicle; and it consists in the novel construction and arrangement of parts which I will now proceed to describe with reference to the drawings, in which—

Figure 1 is a perspective view of a team-drawn vehicle with my draft attachment shown applied to the same, and Fig. 2 is a modification of the doubletree.

In the drawings, A represents a ratchet-ring of teeth applied to the inner side of each of the rear wheels a little distance within the rim, so as to be free from contact with mud, and rigidly fixed to the spokes by bolts, clips, or other equivalent connection.

B is an upright lever, fulcrumed at its lower end either to the bolster, as shown, or to the axle and extending above the tops of the rear wheels. There is one of these levers on each side, and each carries a hook-shaped pawl C, which engages with the ratchet-ring lying in its plane. At the upper end of the lever above the pawl there is jointed a draft-rod D, which extends forwardly and is connected to the end of the doubletree E. This doubletree is pivoted above the plane of the wagon-tongue and its platform-gear and carries at its outer ends the two singletrees F. Ordinarily the leverage of a wagon-wheel is from the axle to the ground. With my attachment the extension of lever B above the wheel makes a greatly-increased leverage whenever the pawl C is engaged with the circle of ratchet-teeth. It is not to be understood that this greater leverage is exercised in a constant pull, for my invention depends for its useful effect upon the vibration of the doubletree about its central pivot. With a double team this doubletree vibrates on account of the fact that the two horses do not step in unison and do not pull exactly in unison, and this makes the doubletree to oscillate or have a vibratory action about its pivotal center. Thus when the near horse starts a little in advance of the other the pawl on the near side engages the ratchet-ring and the near horse has the benefit of the increased leverage, while the other horse pulls with the ordinary leverage. Then when the off horse moves in advance the end of the doubletree on his side advances and the pawl on his side catches the ratchet-teeth and gives to him the benefit of the increased leverage, the near horse then pulling with only the normal leverage of the wheel. As one pawl on one side engages and pulls the pawl on the other side moves back over the ring of teeth to catch a new hold, and these teeth are set a distance apart less than the throw given to the pawl by the vibratory action of the doubletree.

This attachment, it will be seen, works at close intervals in the normal travel of the vehicle, and while possessing a value along level roads and in ordinary travel is specially useful in climbing hills or starting the wagon or in pulling out of a hole, where the horses rarely start in unison.

I am aware that the leverage exerted on a vehicle-wheel has been increased by a ratchet-wheel and a lever with a pawl engaging the ratchet-wheel, notably in car-starting devices, and I do not claim this broadly. I do not know, however, that such levers and pawls have been combined with a doubletree to be directly and constantly worked by its oscillation, which gives a very simple and effective means of increasing the efficiency of a team.

Although I have shown a ratchet and pawl as the preferred form of clutch mechanism between the lever and wheel, it will be understood that any other clutch mechanism may be employed.

It will be noticed that in my invention the doubletree is arranged on the top of the platform-gear carrying the tongue. This allows the under gear to have full play without interfering with the motion or position of the doubletree.

As a modification of my invention I may make the doubletree with an articulated joint in the middle, as shown in Fig. 2, in which the doubletree is made in two sections E' E², swinging about a bolt e, that constitutes the draft attachment to the vehicle. One of these doubletree-sections E' is extended past the draft-bolt e and has a pin e', that when the draft strain is on and the doubletree is straight, as shown in dotted lines, locks against the other section of the doubletree, which two sections then become a rigid doubletree. When the traces are slack, the weight of lever B and pawl C draws the doubletree-sections to the rear, as shown in full lines, and when in this position and the team starts forward both sections of the doubletree move forward and both clutch devices exert a leverage on the two wheels at the same time.

The levers B may be held to the rear either by their own weight or by a positively-acting device, such as an elastic cord c, or by any other desired means.

In defining my invention with greater clearness I would state that levers with clutch devices for engaging the wheels have been connected directly to the two traces of a single team; but this could not give oscillation of the kind that comes from the doubletree and a double team, and the normal pull of the traces are through the clutch devices. I am also aware that two draft connections, one for normal pull and the other having a lever and clutch devices for increased leverage in starting, have heretofore been used. In my invention the doubletree forms the normal draft connection through its center bolt when both horses are pulling equally, and only in an unequal pull and when the doubletree is oscillated do my clutch devices for increased leverage come into effect. This makes one set of draft connections operative both for the pull of equal draft and for the increased leverage.

Having thus described my invention, what I claim as new, and desire to secure by Letters Patent, is—

1. A two-horse vehicle having its doubletree connected by a central bolt to the running-gear for normal draft and having its two ends connected by clutch mechanism with both rear wheels to utilize the movement of the doubletree for increasing the draft leverage substantially as described.

2. In a two-horse vehicle, the combination with the doubletree and one of the wheels; of a clutch mechanism arranged to lock with the wheel at a point removed from the hub, a lever connected to and operating the clutch mechanism, and a draft attachment connecting the lever to the outer end of the doubletree substantially as and for the purpose described.

3. The combination with the oscillating doubletree of a vehicle, having a central draft attachment to the running-gear, and two of the wheels; of two ratchet-rings attached rigidly to the wheels, pawls engaging said ratchet-rings, levers carrying the pawls, and draft-rods connecting the levers to the opposite ends of the doubletree substantially as and for the purpose described.

4. A two-horse vehicle having a platform-gearing and a doubletree pivoted in a plane above said gearing, draft-rods connected to the opposite ends of the doubletree, and two lever clutch mechanisms connected to and operated by said draft-rods and in turn operating upon the wheels at or near their peripheries substantially as described.

5. A two-horse vehicle, a doubletree made in two articulated sections, a central bolt connecting the same to the running-gear, and two draft connections having clutch devices for engaging the wheels with an increased leverage substantially as shown and described.

AUSTIN P. SPEED.

Witnesses:
BRYANT McCAMPBELL,
E. B. KERR.